United States Patent Office 3,441,397
Patented Apr. 29, 1969

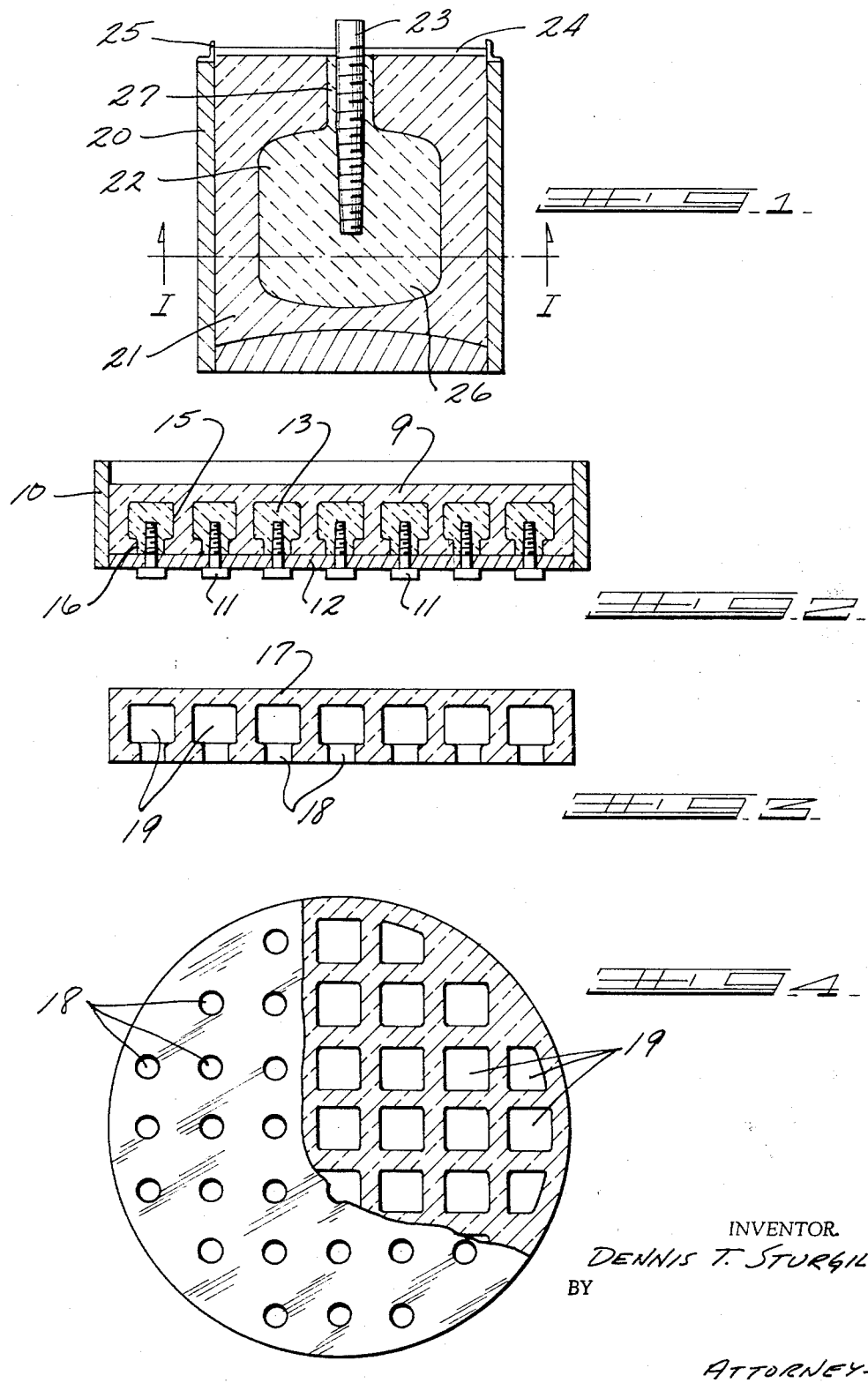

3,441,397
METHOD OF FORMING A GLASS-CERAMIC ARTICLE HAVING AN INTERNAL CAVITY
Dennis T. Sturgill, Toledo, Ohio, assignor to Owens-Illinois, Inc., a corporation of Ohio
Filed Dec. 8, 1966, Ser. No. 600,164
Int. Cl. C03b 19/02, 27/00
U.S. Cl. 65—23           9 Claims

ABSTRACT OF THE DISCLOSURE

Method of forming from molten thermally crystallizable glass, a shaped glass-ceramic article having at least one internal cavity, including the steps of molding the article and using at least one module or male mold part to create the cavity or cavities herein. The glass is solidified around the module or modules and thereafter is thermally crystallized to form a glass-ceramic article. The cavity-forming module is composed of a refractory material having structural strength sufficiently high that it maintains its shape during the solidification of the glass yet sufficiently low that it yields during the shrinkage of the cavity during the crystallization of the glass. The article increases in density and the cavity or cavities shrink during the crystallization, and thereby causing the module to yield under the compressive force created by the volumetric contraction of the cavity during the crystallization, without, however, cracking said article. Thereafter the module material is removed from the cavity.

---

This invention relates to forming hollow glass-ceramic articles. In one particular aspect the invention relates to a novel method of making one-piece, lightweight, crystallized glass telescope mirror blanks.

As is well known in the glass forming art, hollow glass articles can be formed by casting or by pressing in a mold having a male mold member or forming tool to create the hollow configuration or cavity. Of course, when an ordinary metal male forming member is employed the configuration of the article must be such that there is sufficient draft so that the forming tool can be removed from the solidified glass article. Otherwise, the forming tool must be such that it can be removed by dissolving, disintegrating mechanically or by other suitable means to enable the forming tool to be removed from an opening leading to the cavity of smaller cross sectional areas than the cavity proper.

Hollow glass articles have been molded employing as the male mold member a metal such as aluminum that will melt at a temperature at which the molded glass article is rigid enough to be self supporting. The molten glass during the molding process becomes sufficiently chilled during contact with the relatively cooled metal forming tool that it solidifies to a self supporting solid. After a suitable length of time, however, the glass gives up enough heat to the metal member that it is melted and can thus be poured from the formed glass article, as disclosed in copending application U.S. Ser. No. 503,831, filed Oct. 23, 1965, assigned to the assignee of the present application. This method requires precise timing and very careful design of the metal mold members in order to properly balance the heat capacities of the glass and the metal forming member. Moreover, in molding massive articles handling problems are difficult and expensive since the metal must be poured from the glass while it is hot or it will solidify.

Still another method for molding cavities in glass parts is disclosed in copending application, Ser. No. 437,431, filed Mar. 5, 1965, now abandoned and its continuation-in-part application Ser. No. 468,691, filed July 1, 1965, both assigned to the assignee of the present invention. In this method the cavity-forming male mold member is composed of a material that can be physically disintegrated, as by chipping and scraping, so that it can be removed through a relatively small hole leading to the cavity.

A suitable male mold material disclosed in the foregoing applications is an amorphous fused foamed silica known as Glasrock Foam No. 25, made by Glasrock Products, Inc. of Atlanta, Ga. The use of such a module is disclosed especially in connection with forming a hollow article of a glass that is thermally crystallizable. After the glass article has been made, the article is thermally crystallized at an elevated temperature while the ceramic mold member is still in place in the cavity. For instance, one example is Ser. No. 468,691 discloses increasing the temperature at the rate of about 5° F. per minute to 1,350° F. and holding the molded article with the Glasrock module still in place for 50 hours at that temperature, and slowly cooling to room temperature. While this method is advantageous, it has been found that fractures are sometimes created in the crystallized glass article formed from the glass by such heat treatment.

Such fractures can occur because many thermally crystallizable glasses shrink (increase in density) when they are converted from the glass state to the crystalline or glass-ceramic state by thermal in situ crystallization. Since the mold material, the Glasrock in this instance, does not change state, does not shrink, and therefore the glass-ceramic is placed in tension until the module material is removed. It has been found that this tensional stress sometimes causes cracking of the molded glass-ceramic part, depending on the inherent strength of the glass-ceramic, as well as on the shape of the cavity since some physical designs concentrate stress at particular points.

Of course, the difficulties caused by the large amount of shrinkage (often one or two percent linear shrinkage), resulting on conversion of the glass to the glass-ceramic form, could be avoided by removing the Glasrock or other mold material before the crystallization step. However, as a practical matter, the removal of the mold material cannot be accomplished easily without cooling the molded glass article, which then must be reheated to very high temperatures in order to effect the in situ crystallization. It is, moreover, much more economical to allow the glass article to remain at an elevated temperature and then proceed to the thermal in situ crystallization step before removal of the material comprising the male mold member.

It is therefore a primary object of the present invention to provide a novel and economical method for making a glass-ceramic article containing one or more cavities, while avoiding cracking of the article during in situ crystallization of the formed glass article while the male mold member is still in place.

Another object of the invention is to provide an improved process for making a one-piece lightweight, glass-ceramic telescope mirror blank, wherein the mirror blank has a plurality of separate cavities disposed throughout its interior in communication with the ambient atmosphere through small openings in one surface of the blank.

Yet another object of the invention is to accomplish the foregoing objective using a male mold material which is easily disintegrated and removed from the crystallized glass article.

Other objects, as well as aspects and advantages, of the present invention will become apparent from the following discussion of the invention, taken in conjunction with the drawings.

FIG. 1 is a cross-sectional side view of a hollow article 21 in mold 20 with forming member 22 in place.

FIG. 2 is a cross-sectional side view of a telescope mirror blank shown cast in a mold, wherein the modules are supported from the bottom of the mold.

FIG. 3 is a cross-sectional side view of the glass-ceramic mirror blank illustrating the plurality of cavities therein.

FIG. 4 is a plan view of the underside of the glass-ceramic telescope mirror blank showing the plurality of openings disposed above the individual cavities, showing the cavities and the rib structure in the broken away portion of the mirror blank.

In the method of forming from molten thermally crystallized glass a shaped glass-ceramic article having an internal cavity, including the steps of molding said article by a molding means including at least one module or a male mold part to create said cavity, solidifying said glass around said at least one module, and thereafter thermally in situ crystallizing said glass article to a glass-ceramic article, wherein said article increases in density and thus the cavity shrinks during said crystallization, there is provided according to the present invention the improvement comprising using as said, at least one male mold part, a module composed of a refractory material having structural strength sufficient to effectuate forming said cavity in the thermally crystallizable glass and yet low enough so that said module yields under the compressive force created by the volumetric contraction of said article during said crystallization, without cracking said article.

A further improvement of the present invention is the concept and step of employing as the material of the cavity-forming member, a material which can be disintegrated by contacting with water. Broadly, of course, it is merely necessary that the cavity-forming material be removable from the cavity, such as by physical disintegration, dissolving in a solvent, melting at a temperature at which the glass-ceramic article will not be deformed, dissolving by chemical attack, or the like. However, it is particularly advantageous and economical to employ a material that can be disintegrated by contacting with water.

The invention is broadly applicable to making hollow glass-ceramic articles when employing a thermally crystallizable glass that undergoes volumetric shrinkage (increase in density) when it is thermally crystallized to the glass-ceramic state. For instance, the present process can be used with the thermally in situ crystallizable glass compositions that shrink on crystallization to the glass-ceramic state and are encompased by the disclosures of the following patents and applications, whose glass and glass-ceramic compositions and teachings of suitable crystallization heat treatment schedules are incorporated herein by reference: U.S. Ser. No. 464,147, filed June 15, 1965, and Dutch patent application 6,509,945; U.S. Ser. No. 352,958, filed Mar. 18, 1964 now Patent No. 3,380,818 issued Apr. 30, 1968, and Dutch patent application 6,503,460; U.S. Ser. No. 574,927, filed Aug. 25, 1966; French Patent 1,337,180 (1963); French Patent 1,300,-614; British Patent 1,010,513 (1965); U.S. Patent 3,282,-712 (1966); U.S. Patent 3,279,931 (1966); U.S. Patent 3,252,811 (1966); and U.S. Patent 3,157,522 (1964).

The present invention is especially useful for making low coefficient of thermal expansion glass-ceramic mirror blanks such as are disclosed and claimed in U.S. application Ser. No. 468,691, filed July 1, 1965, and low coefficient of thermal expansion glass-ceramic mirror blanks made according to the process disclosed and set forth in claims of U.S. application Ser. No. 496,966, filed Oct. 18, 1965. For this purpose, especially useful glass and glass-ceramic compositions are those set forth in the aforementioned U.S. Ser. No. 464,147 and Dutch patent application 6,509,945, which consist essentially of the following components in the indicated weight percent limits, based on the total glass composition:

| Component: | Weight percent |
| --- | --- |
| $SiO_2$ | 56–70 |
| $Al_2O_3$ | 18–27 |
| $Li_2O$ | 3.4–4.5 |
| $CaO$ | 0–3 |
| $ZnO$ | 0–2 |
| $B_2O_3$ | 0–4 |
| $TiO_2$ | 0–6 |
| $ZrO_2$ | 0–3 |
| $MgO$ | 0–3 |
| $Na_2O$ | 0–1 |
| $P_2O_5$ | 0–3 |
| $(SiO_2+Al_2O_3)$ | At least 82 |
| $(SiO_2+Al_2O_3+B_2O_3+P_2O_5)$ | 86–91 |
| $(SiO_2+Al_2O_3+P_2O_5+Li_2O)$ | No more than 93 |
| $(TiO_2+ZrO_2)$ | 2–6 | wherein the ratio of $(CaO+MgO+Na_2O+B_2O_3)$ to $Li_2O$ is less than 2.4 and the ratio of $SiO_2$ to $Al_2O_3$ is no more than 3.8, and preferably no more than 3.3. As set forth in the foregoing applications, essential features of such thermally crystallizable glass compositions is that they can be thermally in situ crystallized to transparent crystallized glass-ceramics containing as predominant crystalline species lithium-containing crystalline phases, either as beta-eucryptite or beta-eucryptite-like crystals, or as beta-spodumene or beta-spodumene-like crystals, or both, as indicated by X-ray diffraction data, the ceramic containing a multitude of such crystalline species in radom orientation throughout said ceramic and dispersed in a glassy matrix remaining as a result of said in situ crystallization, substantially all of the crystals of said ceramic being of a diameter of less than one third micron measured across the largest lineal dimension of the crystals, said transparent crystallized glass-ceramic having a coefficient of thermal expansion of from $-10$ to $10 \times 10^{-7}/°$ C. (0–300° C.). Of course, as further set forth in the cited applications, the same compositions can also be thermally crystallized to opaque glass-ceramics having low coefficients of thermal expansion of less than $20 \times 10^{-7}/°$ C. over the range zero to 300° C. However, for telescope mirror blanks the transparent form is usually preferred.

Also particularly useful in the present invention, are the glasses (and glass-ceramics resulting from thermal in situ crystallization) set forth in copending U.S. application Ser. No. 574,927, filed Aug. 25, 1966, each of said glass compositions being thermally in situ crystallizable to form a transparent at least partially crystalline ceramic which (1) has an average lineal coefficient of thermal expansion of $-5$ to $5 \times 10^{-7}$ over the range from 0–300° C., (2) contains as predominant crystalline species lithium-containing phases, either as beta-eucryptite or beta-eucryptite-like crystals, or as beta-spodumene or beta-spodumene-like crystals, or both, as indicated by X-ray diffraction data, said ceramic containing a multitude of such crystalline species in random orientation throughout said ceramic and dispersed in a glassy matrix remaining as a result of said in situ crystallization, substantially all of the crystals of said ceramic being of a diameter less than 1/3 micron measured across the largest lineal dimension of the crystals and (3) consists essentially of the following components in the following weight percentage ranges in the total glass:

| Component: | Weight, percent |
|---|---|
| $SiO_2$ | 58–72 |
| $Al_2O_3$ | 19–24 |
| $Li_2O$ | 3–5 |
| $CaO$ | 2–6 |
| $TiO_2$ | 0–2.5 |
| $ZrO_2$ | 0–4 |
| $Na_2O$ | 0–1 |
| $K_2O$ | 0–1 |
| Total $R_2O$ | 0–1.5 |
| $TiO_2+ZrO_2$ | 1.5–4 |
| ($CaO+R_2O$ minus $Li_2O$) | <1 |
| $ZnO$ | ≯0.3 |
| $P_2O_5$ | ≯0.3 |
| $B_2O_3$ | ≯0.2 |
| ($ZnO+P_2O_5$) | ≯0.4 |
| ($ZnO+B_2O_3$) | ≯0.3 | where R is any Group I–A alkali metal other than Li.

It should be noted that, the present specification, as in the aforementioned applications Ser. Nos. 468,691 and 574,927, the terms beta-eucryptite crystals and beta-eucryptite-like crystals have been used in an alternative sense. Thus, while beta-eucryptite is often thought of as the species crystal having one mole of lithia and one mole of alumina and two moles of silica, both terms are used in this application to designate crystalline species having the beta-eucryptite structure, as shown by X-ray diffraction, but the peaks can be shifted slightly depending on whether there is a definite amount of silica present other than exactly two moles, either more or less silica than the two moles. Similarly, the terms beta-spodumene crystals and beta-spodumene-like crystals are used alternatively and in a generic sense, specifying crystalline species that have the crystalline structure of beta-spodumene that contains 4 moles of silica to one mole of alumina and one of lithia, but with the peaks shifted somewhat when the crystalline structure contains more or less than 4 moles of silica. When such terms are used in the claims of the present application, therefore, the terms beta-eucryptite and beta-spodumene are each used in this generic sense.

Both types of the foregoing glass-ceramic compositions can be used to make hollow articles according to the present invention and to make glass-ceramic, low expansion mirror blanks according to the methods set forth in U.S. application Ser. No. 468,691, filed July 1, 1965, and U.S. application Ser. No. 496,966, filed Oct. 18, 1965, but modified according to the present invention to employ as the male or cavity forming members, a material having the characteristics hereinbefore set forth as applicable in the present invention.

Indeed, as stated, an essential concept of the present invention is that the male mold part employed in molding the hollow articles be composed of a refractory material having sufficient structural strength to hold its shape and dimensions while forming the cavity (solidifying the molten glass around the cavity forming member) yet having insufficient structural strength (at least after said forming) that the module yields under the compressive force created by the volumetric contraction of the glass-ceramic article during its crystallization, so that the forming member will be compressed or crushed or otherwise deformed instead of cracking the glass-ceramic article or allowing the tensional stresses set up in the glass-ceramic article by its shrinkage around a rigid forming member to continue to exist.

While any refractory material that will not react with a molten glass and meets the foregoing requirements can be employed as the cavity-forming mold member according to the present invention, one class of material suitable for this purpose are castable mixtures of finely divided refractory base materials and thermally decomposable binders. The refractory base is finely divided silica ($SiO_2$) and the binder is a hydrated calcium sulfate.

Mixtures of binder and refractory suitable for use in practicing the present invention can be prepared by thoroughly dry mixing a binder such as calcium sulfate hemihydrate (plaster of Paris) with finely divided silica ($SiO_2$) as the refractory. The silica employed is usually of the particle size of 200 mesh to 400 mesh by standard sieve analysis. The calcium sulfate hemihydrate content usually varies from about 10 to 55 parts while the refractory is from about 35 to 90 parts by weight of the dry mixture. Other compositions as above can include minor amounts of modifying agents such as $B_2O_3$, $Al_2O_3$, $K_2SO_4$ and NaCl.

This dry binder refractory mixture is then thoroughly mixed with water to form a paste or slip and is then cast into molds to form modules of the desired configuration. The module can be practically any shape desired in that no draft is required since the module will be disintegrated before removal from the finished mirror blank. The amount of water used to form the slip is not critical as long as the castable paste is achieved. An excess of water should be avoided since this will form a very thin slip and problems may result upon drying. Usually about 15 to 50 parts of water per 100 parts of the binder, refractory mixture described above is satisfactory.

When the slip has been prepared the modules are cast in the normal manner in molds of suitable shapes. The casting is then allowed to set. The casting is then removed from the mold and carefully dried by heating slowly at a temperature below the boiling point of water until essentially all of the free water (water not chemically bound) is driven off. The module casting can then be heated rather rapidly to a temperature of about 1,200° F. to about 2,200° F. to complete the binder dehydration. This temperature is maintained for sufficient time to insure that the entire casting has reached temperatures in the foregoing range. This heat treatment (1,200° F. or above) dehydrates the plaster of Paris to anhydrous calcium sulfate and results in a marked decrease in the crushing strength. The module is then structurally stable enough to be used in contact with the molten glass in the mirror blank casting or press molding operation, and yet readily contracts (by crushing) under the influence of stresses developed on the crystallization of the glass.

In a preferred embodiment, small removable holder rods are cast into the module when it is cast to facilitate positioning in the glass mold. Ceramic, metal or graphite holder rods can be used. The rods shown in the drawings are threaded into the module for ease of removal.

In making a mirror blank shown in FIGURE 3 according to the present invention the mirror blank is formed by pouring a molten mass of thermally crystallizable glass 9 into an annular mold 10 which is provided with a plurality of upwardly extending rods 11 extending through the bottom of the mold 12. In the drawings, the rods 11 are shown as threaded. It is often preferable that the mold parts, including the modules 13 be preheated somewhat in order to avoid extreme thermal gradients.

Removably secured to each rod is a shaped module 13 (cavity forming unit) having a body portion 15. As shown in FIG. 2, the module has a neck portion 16 of reduced diameter integral with the body portion 15, and removably disposed about the screw-threaded rod 11 so that the neck portion 16 completely shields rod 11 from the molten mass of glass 9. Annular mold 10 with mold bottom 12 can be of any suitable refractory material, including graphite, metal or ceramic. Particularly suitable for mold 10 and bottom 12 is a metal or graphite mold material with a coating of a fibrous matting of silica-alumina material, such as the material known commercially as Fiberfrax. The modules 13 with their screw-threaded rods 11 are fastened into mold bottom 12, as shown in FIG. 2.

After the mirror blank has been cast, the annular mold 10 removed, and the mirror blank subjected to a prescribed crystallization heat treatment and thereafter cooled to ambient temperature, the modules can be readily removed by mechanical or hydraulic disintegration, or other suitable means, from the interior of the blank through the openings 18 on the underside of the mirror blank. The mirror blank 17 having a plurality of cavities 19 is thus obtained, as is illustrated in FIGURE 3. During the crystallization of the blank from a glass to a glass-ceramic at elevated temperature the presence of the modules has no detrimental effect since they readily yield to accommodate the volumetric contraction taking place because of the conversion of the glass to the higher density glass-ceramic material.

FIG. 1 illustrates a structure and method of forming a hollow container 21 according to the present invention. Thus, the present invention can be used to prepare a glass-ceramic container containing a narrow opening. Such hollow objects can be employed to store liquids or solids or for any other purpose.

Such a hollow object as is shown in FIG. 1 can also be used to form, together with a plurality of like hollow objects, a telescope mirror blank from a thermally crystallizable glass in a manner described in said application Ser. No. 496,966, all of the teachings of which with respect to formation of glass-ceramic mirror blanks are incorporated herein by reference. In such event, a cross section of annular mold 20, molded part 21 and module 22, taken along the section line I—I are hexagonal. As shown in FIG. 1 the molded part 21 is fabricated by pouring a molten thermally crystallizable glass into an annular mold 20 which is provided with a downwardly extended pin 23, secured to mold 20 by bar 24 inserted into bar holder 25. Removably secured to pin 23 is a shaped module or cavity-forming unit 22. Module 22 has a body portion 26 and a neck portion 27 integral therewith and removably disposed about pin 23 so the neck portion 27 completely shields pin 23 from the molten vitreous mass. After the glass body 21 has solidified, the annular mold member 20, together with members 24 and 25 and pin 23 can be removed, before the thermal in situ crystallization of body 21 with the cavity forming member 22 still in place. The void volume in the module formed by the pin provides sufficient space for the volumetric contraction of the module as it is crushed.

The following examples of the practice of the invention are merely illustrative, and it is to be understood that the scope of the invention is not to be considered limited thereby.

EXAMPLE I

One hundred parts of calcium sulfate bonded siliceous plaster containing plaster of Paris and silica ($SiO_2$) in the weight ratio of about 1 part of plaster of Paris to about 3 parts of finely divided silica, is thoroughly admixed with about 50 parts of water to form a slip. The slip is cast in a lead mold having therein a cylindrical cavity 2 inches in depth by 2 inches in diameter.

A threaded carbon bar of about 12 inches in length and ½ inch in diameter is suspended over the mold with the threaded end immersed in the plaster slip, while the mold is slowly heated to about 200° F. over a 2 hour period to drive off the free water.

The formed plaster module is then removed from the lead mold. The module is then heated to 2,000° F. and maintained at that temperature for 7 hours to assure complete dehydration of the binder and is thereafter cooled to about 1,200° F. The module is then ready for use in conjunction with the glass-ceramic forming operation as described below.

A cylindrical carbon mold having an internal cavity 4 inches in diameter by 6 inches in depth is preheated to 1,200° F. A molten thermally crystallizable glass of the theoretical composition:

| Constituent: | Percent by weight |
|---|---|
| $SiO_2$ | 66.8 |
| $Al_2O_3$ | 20.8 |
| $Li_2O$ | 3.8 |
| $ZrO_2$ | 2.0 |
| $ZrO$ | 1.2 |
| $TiO_2$ | 1.8 |
| $CaO$ | 2.7 |
| $Cl_2$ | 0.2 |
| $Sb_2O_3$ | 0.3 | having a temperature of about 2,700° F. is poured into the preheated mold to the depth of 5 inches.

The module, still at 1,200° F., is carefully inserted into the molten glass to a depth 4 inches. A small amount of outgassing accompanies the insertion of the module into the molten glass. The mold assembly is then cooled to the point where the glass is self supporting. The carbon mold is then inverted and the formed glass article is removed. The carbon holder rod is also removed at this time.

To effectuate crystallization, the formed glass article is maintained at 1,375° F. for 3 hours followed by 2 hours at 1,500° F. At the end of this period the article is cooled to room temperature. The resulting transparent, thermally in situ crystallized glass-ceramic article has a coefficient of thermal expansion of about minus $0.5 \times 10^{-7}/°$ C. (0–300° C.). No cracks were observed in the article even though the article had contracted (increased in density) during the crystallization. The module was observed to be compressed and slightly crushed.

Tap water is directed through a small hose into the hole in the article where the carbon holder rod had been. The remaining module structure is disintegrated by contact with the water, and the residue is readily flushed away as a fine sand leaving an integral glass-ceramic article similar to articles shown in FIG. 1.

Similar results can be obtained by utilizing the Ransom and Randolph Company's investment plaster sold under the trade name of "R & R Ultra-Vest" as the module material.

EXAMPLE II

One hundred parts of a calcium sulfate bonded siliceous plaster containing about 20% plaster of Paris and 80% finely divided calcined silica refractory is thoroughly admixed with about 35 parts of water to form a slip. This slip is then cast in a lead mold in the shape shown in FIGURE 2 with main dimensions of about 2 inches square (FIGURE 4) and a height of about 1¾ inches. The module is then heated slowly over a 2-hour period to about 200° F. to drive off the free water. When the casting has thickened sufficiently, a threaded carbon rod 11 is inserted, and the heating continued.

After the free water has been driven off, the formed module is removed from the module mold. Several additional modules are formed in the same manner. The modules are then mounted on the mirror blank mold bottom as shown in FIG. 2. The mold bottom is assembled with a split-ring annular metallic mold of about 17 inches in diameter and 3 inches in depth, as shown in FIGURE 2. The assembly is then preheated to about 1,200° F. A molten thermally crystallizable glass having a temperature of about 2,700° F. is poured into the preheated mold to the desired depth (about 3 inches). The assembly is allowed to cool slowly until the viscosity of the glass increases to the point where the glass article is self-supporting. The threaded holder rods are removed, the split-ring mold is opened. The glass assembly is supported by the bottom surface of the mold.

To effectuate crystallization, the following procedures are employed. The glass assembly together with the mold bottom is promptly placed in an oven which has been preheated to a temperature of about 1,000° F. The oven temperature is increased to 1,300° F. where it is held for 240 hours, then the temperature is increased at the rate of about 10° F. per minute to 1,550° F., where it is held for 64 hours.

At the end of this period, the assembly is cooled at the rate of about 5° F. per minute until the temperature of 1,000° F. is reached, and then the cooling rate is increased to about 10° F. per minute until room temperature is reached. The resulting transparent, thermally in situ crystallized glass-ceramic mirror blank has a coefficient of thermal expansion of $2.9 \times 10^{-7}/°$ C. (0–300° C.). During the crystallization the cavities shrink because of the increase in density of the mirror blank on crystallization. The modules as a result are compressed and crushed slightly into the void volume formed by the carbon holder rods. No cracks are developed in the mirror blank.

Tap water is directed through a small hose into the holes in the underside of mirror blank where the holder rods had been. The remaining module structure is disintegrated by contact with the water, and the residue is readily flushed away as a fine sand. The resulting hollow glass-ceramic mirror blank has a plurality of cavities disposed throughout its inner portion as shown in FIG. 3.

Similar results can be obtained by utilizing the Ransom and Raldolph Company's investment plaster sold under the trade name of "R & R 551 Investment" as the module material.

The glass used in this example is made by melting normal batch ingredients at a glass temperature of about 2,900° F. for about 3 days in a high-alumina refractory (Monofrax M) tank furnace, using a slight excess of air for an oxidizing atmosphere. The batch is shown below in parts by weight:

| Ingredient: | Parts by weight |
|---|---|
| Petalite [1] | 435.82 |
| Alumina [2] | 39.64 |
| Zircon sand [3] | 11.36 |
| Limestone (55.4% CaO) | 18.05 |
| $TiO_2$ | 5.05 |
| $Li_2CO_3$ | 2.45 |
| Sodium antimonate hydrate (63.2% $Sb_2O_3$, 12% $Na_2O$) | 2.09 |
| NaCl | 2.21 |

[1] 4.2% $LiO$, 16.2% $Al_2O_3$, 77.7% $SiO_2$, 0.4% $Na_2O$, 0.2% $K_2O$ and 0.027% $Fe_2O_3$, and other minor impurities, including 1% ignition loss.
[2] 99.5% $Al_2O_3$, 0.03% $Fe_2O_3$, 0.1% $Na_2O$, 0.08% $SiO_2$, 0.2+% ignition loss.
[3] 66% $ZrO_2$, 33.5% $SiO_2$, 0.25% $TiO_2$, 0.1% $Fe_2O_3$.

The glass and the resulting glass-ceramic mirror blank ultimately formed in Example II has the following weight percent composition:

| Component: | Weight, percent |
|---|---|
| $SiO_2$ | 68.4 |
| $Al_2O_3$ | 22 |
| CaO | 2 |
| $Li_2O$ | 3.9 |
| $TiO_2$ | 1 |
| $ZrO_2$ | 1.5 |
| $Na_2O$ | 0.7 |
| $K_2O$ | 0.2 |
| $Sb_2O_3$ | 0.3 |

EXAMPLE III

Using the same glass melt as in Example II, a glass-ceramic container of the configuration shown in FIG. 1 is made using the mold equipment described in connection with FIG. 1. The heat treatment for crystallization is the same as before described in Example II except that the first heat treatment step is 1,300° F. for 260 hours and the second heat treatment step is 1,600° F. for about 1 hour. A transparent crystallized glass-ceramic container of nearly zero coefficient of thermal expansion per ° C. over the range zero to 300° C. is obtained.

As will be evident to those skilled in the art, modifications of this invention can be made or followed in the light of the foregoing disclosure without departing from the spirit and scope of the disclosure or from the scope of the claims.

I claim:
1. In the method of forming from molten thermally crystallizable glass that shrinks on crystallization, a shaped glass-ceramic article having at least one internal cavity, said internal cavity being in communication with the ambient atmosphere through a passageway or opening extending to and through a surface of said article, at least a portion of said opening being of smaller cross-sectional area than the cross-sectional area of said cavity, wherein said molten glass has at least one module or male mold part disposed therein to create said at least one cavity, solidifying said glass around said at least one module and thereafter thermally crystallizing said glass article to a glass-ceramic article by heat treating said glass article in the nucleation temperature range for a sufficient period of time for said glass to develop nuclei in said glass and thereafter heat treating the nucleated glass within the crystallization temperature range of the glass wherein said article increases in density and thus the cavity shrinks during said crystallization, the improvement comprising heat treating the said glass article to obtain said crystallization while the cavity-forming module is disposed in the glass article, said cavity-forming module being composed of a refractory material having structural strength sufficiently high that it maintains its shape during said glass solidification yet sufficiently low that it yields during the shrinkage of the cavity during said crystallization, and causing said module to yield under the compressive force created by the volumetric contraction of said cavity during said crystallizaton, without cracking said article, and thereafter removing said module from said cavity.

2. The improvement in the method as defined in claim 1 wherein said module material is contacted with water after yielding under the compressive forces created by the volumetric contraction of said article during said crystallization whereby said module material is disintegrated and removed from said cavity.

3. In the method of forming from molten thermally crystallizable lithia-alumino-silicate glass, a lightweight glass-ceramic telescope mirror blank having at least one internal cavity, said cavity being in communication with the ambient atmosphere through a passageway or opening extending to and through a surface of said blank, at least a portion of said opening being of smaller cross-sectional area than the cross-sectional area of said cavity, wherein said molten glass has at least one module or male mold part disposed therein to create said at least one cavity, solidifying said glass around said at least one module or modules and thereafter thermally crystallizing said glass to a glass-ceramic mirror blank by heat treating said mirror blank in the nucleation temperature range for a sufficient period of time for said glass to develop nuclei in said glass and thereafter heat treating the mirror blank within the crystallization temperature range of the glass, wherein said mirror blank increases in density and thus the at least one cavity shrinks during said crystallization, the improvement comprising heat treating the said glass article to obtain said crystallization while the cavity-forming module is disposed in said blank, the cavity-forming module being compoesed of a refractory material having structural strength sufficiently high that it maintains its shape during said glass solidification yet sufficiently low that it yields during the shrinkage of the cavity during said heat crystallization, and causing said module to yield under the compressive force created by the volumetric contraction of said cavity or cavities during said crystallization, without cracking said mirror blank, and thereafter removing said module material from said cavity or cavities.

4. A method of making a lightweight glass-ceramic telescope mirror blank having at least one internal cavity, said cavity being in communication with the ambient atmosphere through a passageway or opening extending to and through a surface of the mirror blank, at least a portion of said opening being of smaller cross-sectional area than the cross-sectional area of the cavity, comprising maintaining a thermally crystallizable lithia-aluminosilicate glass in a mold, said glass having the property of contracting in volume upon crystallization, maintaining a plurality of shaped modules, each of which has a support member affixed thereto within said mold, each of said shaped modules being immersed in said molten glass, said modules being of a material which is resistant to said molten glass and retains its shape therein while said glass is molten, increasing the viscosity of the molten glass until said glass is self supporting and subjecting said glass to a heat treatment for a period of time sufficient to thermally in situ crystallize said glass to form a glass-ceramic telescope mirror blank while the module material is retained in the glass, the crystallization of the glass causing consequent shrinkage of said cavity thereby producing compressive stresses on the module material whereby the module material is crushed and subsequently removing the module material.

5. The method as defined in claim 4, wherein the molten glass used has a composition consisting essentially of the following components present in the glass in the following weight percent ranges:

| Component: | Weight, percent |
|---|---|
| $SiO_2$ | 56–70 |
| $Al_2O_3$ | 18–27 |
| $Li_2O$ | 3.4–4.5 |
| $CaO$ | 0–3 |
| $ZnO$ | 0–2 |
| $B_2O_3$ | 0–4 |
| $TiO_2$ | 0–6 |
| $ZrO_2$ | 0–3 |
| $MgO$ | 0–3 |
| $Na_2O$ | 0–1 |
| $P_2O_5$ | 0–3 |
| $(SiO_2+Al_2O_3)$ | At least 82 |
| $(SiO_2+Al_2O_3+B_2O_3+P_2O_5)$ | 86–91 |
| $(CaO+MgO+MnO+Na_2O)$ | 2.5–6 |
| $(SiO_2+Al_2O_3+P_2O_5+Li_2O)$ | No more than 93 |
| $(TiO_2+ZrO_2)$ | 2–6 | wherein the ratio of $(CaO+MgO+ZnO+Na_2O+B_2O_3)$ to $Li_2O$ is less than 2.4 and the ratio of $SiO_2$ to $Al_2O_3$ is no more than 3.8.

6. The method as defined in claim 4, wherein the molten glass used has a composition consisting essentially of the following components present in the glass in the following weight percent ranges:

| Component: | Weight, percent |
|---|---|
| $SiO_2$ | 58–72 |
| $Al_2O_3$ | 19–24 |
| $Li_2O$ | 3–5 |
| $CaO$ | 2–6 |
| $TiO_2$ | 0–2.5 |
| $ZrO_2$ | 0–4 |
| $Na_2O$ | 0–1 |
| $K_2O$ | 0–1 |
| Total $R_2O$ | 0–1.5 |
| $TiO_2+ZrO_2$ | 1.5–4 |
| $(CaO+R_2O$ minus $Li_2O)$ | <1 |
| $ZnO$ | ≯0.3 |
| $P_2O_5$ | ≯0.3 |
| $B_2O_3$ | ≯0.4 |
| $(ZnO+P_2O_5)$ | ≯0.4 |
| $(ZnO+B_2O_3)$ | ≯0.3 | where R is any Group I–A alkali metal other than Li.

7. The method as defined in claim 1, wherein said module is cast from a material containing water, silica and a calcium sulfate compound and said module is heated to a temperature of between 1,200° F. and 2,200° F. from a time sufficient to substantially dehydrate said module before contacting said module with said molten glass.

8. The method of claim 7, wherein said calcium sulfate is in the form of calcium sulfate hemihydrate.

9. The method of claim 8, wherein said module is cast from a mixture comprising about 10 to about 55 parts of calcium sulfate hemihydrate and about 35 to about 90 parts of fine silica; in combination with about 15 to about 50 parts of water per 100 parts of said mixture.

References Cited

UNITED STATES PATENTS

| | | | |
|---|---|---|---|
| 301,329 | 7/1884 | Beck | 65—23 |
| 807,459 | 2/1905 | Harloe | 65—23 |
| 865,314 | 9/1907 | Osborn | 65—23 |
| 2,045,716 | 6/1936 | McCauley | 65—93 XR |
| 2,132,390 | 10/1938 | Blau | 65—33 |
| 3,113,877 | 12/1963 | Janakirawia-rao | 65—33 XR |
| 3,157,522 | 11/1964 | Stookey | 65—33 XR |
| 3,241,985 | 3/1966 | Kuwayama | 65—33 XR |
| 3,246,972 | 4/1966 | Smith | 65—33 XR |
| 3,277,535 | 10/1966 | Rupert. | |

S. LEON BASHORE, *Primary Examiner.*

FRANK W. MIGA, *Assistant Examiner.*

U.S. Cl. X.R.

65—33, 68, 169, 306, 374

U.S. DEPARTMENT OF COMMERCE
PATENT OFFICE
Washington, D.C. 20231

UNITED STATES PATENT OFFICE
CERTIFICATE OF CORRECTION

Patent No. 3,441,397                                             April 29, 1969

Dennis T. Sturgill

It is certified that error appears in the above identified patent and that said Letters Patent are hereby corrected as shown below:

Column 9, line 45, in footnote 1, "4.2% IiO" should read -- 4.2% $Li_2O$ --.

Signed and sealed this 14th day of April 1970.

(SEAL)
Attest:

Edward M. Fletcher, Jr.                          WILLIAM E. SCHUYLER, JR.
Attesting Officer                                      Commissioner of Patents

PO-1050
(5/69)

UNITED STATES PATENT OFFICE
CERTIFICATE OF CORRECTION

Patent No. 3,441,397     Dated April 29, 1969

Inventor(s) DENNIS T. STURGILL

It is certified that error appears in the above-identified patent and that said Letters Patent are hereby corrected as shown below:

Col. 8, line 8, "ZrO" is changed to ---ZnO---.

Signed and sealed this 18th day of February 1975.

(SEAL)
Attest:

RUTH C. MASON
Attesting Officer

C. MARSHALL DANN
Commissioner of Patents
and Trademarks